US012069490B2

(12) United States Patent
Liberg et al.

(10) Patent No.: US 12,069,490 B2
(45) Date of Patent: Aug. 20, 2024

(54) NON-TERRESTRIAL SINGLE FREQUENCY NETWORK

(71) Applicant: TELEFONAKTIEBOLAGET LM ERICSSON (PUBL), Stockholm (SE)

(72) Inventors: Olof Liberg, Enskede (SE); Xingqin Lin, Santa Clara, CA (US); Yi-Pin Eric Wang, Fremont, CA (US)

(73) Assignee: Telefonaktiebolagget LM Ericsson (Publ), Stockholm (SE)

(*) Notice: Subject to any disclaimer, the term of this patent is extended or adjusted under 35 U.S.C. 154(b) by 353 days.

(21) Appl. No.: 17/608,115

(22) PCT Filed: May 1, 2020

(86) PCT No.: PCT/IB2020/054167
§ 371 (c)(1),
(2) Date: Nov. 1, 2021

(87) PCT Pub. No.: WO2020/222203
PCT Pub. Date: Nov. 5, 2020

(65) Prior Publication Data
US 2022/0225119 A1 Jul. 14, 2022

Related U.S. Application Data

(60) Provisional application No. 62/841,280, filed on May 1, 2019.

(51) Int. Cl.
H04W 16/28 (2009.01)
H04B 7/185 (2006.01)
(Continued)

(52) U.S. Cl.
CPC ........ H04W 16/28 (2013.01); H04B 7/18513 (2013.01); H04B 7/18526 (2013.01); H04L 5/0048 (2013.01); H04W 88/16 (2013.01)

(58) Field of Classification Search
CPC .......................... H04B 7/18513; H04B 7/2041; H04B 7/1851; H04B 7/18563; H04B 7/18515;
(Continued)

(56) References Cited

U.S. PATENT DOCUMENTS

2010/0068993 A1 3/2010 Khan
2018/0288756 A1* 10/2018 Xia ................... H04W 72/0453

FOREIGN PATENT DOCUMENTS

SG 10201606612 * 10/2016
WO 2019029631 A1 2/2019

OTHER PUBLICATIONS

3GPP, TR 38.821 V0.5.0 "3rd Generation Partnership Project; Technical Specification Group Radio Access Network; Solutions for NR to support non-terrestrial networks (NTN) (Release 16)", 3GPP TR 38.821 V0.5.0, Apr. 2019.

* cited by examiner

Primary Examiner — Khalid W Shaheed
(74) Attorney, Agent, or Firm — Weisberg I.P. Law, P.A.

(57) ABSTRACT

Wireless devices, base stations, and other network devices and method are described that improve link level performance in a non-terrestrial network (NTN). In an embodiment, a method includes one or more of: configuring an NB-IoT (narrowband-Internet of Things) NPSS (Narrowband Primary Synchronization Signal) transmissions in multiple spot beams overlapping in time and frequency, configuring LTE PSS (Primary Synchronization Signal) transmissions in multiple beams overlapping in time and frequency, configuring NR (New Radio) PSS transmissions (e.g., which support the same shift of a respective M-sequence that defines the NR PSS) in multiple beams overlapping in time and frequency, configuring NR PSS transmissions (e.g., which support the same shift of a respective M-sequence that defines the NR PSS) in multiple beams
(Continued)

configured to share the same SS/PBCH block index overlapping in time and frequency.

18 Claims, 12 Drawing Sheets

(51) Int. Cl.
*H04L 5/00* (2006.01)
*H04W 88/16* (2009.01)

(58) Field of Classification Search
CPC .. H04B 7/18517; H04W 84/06; H04W 16/28; H04W 88/16
See application file for complete search history.

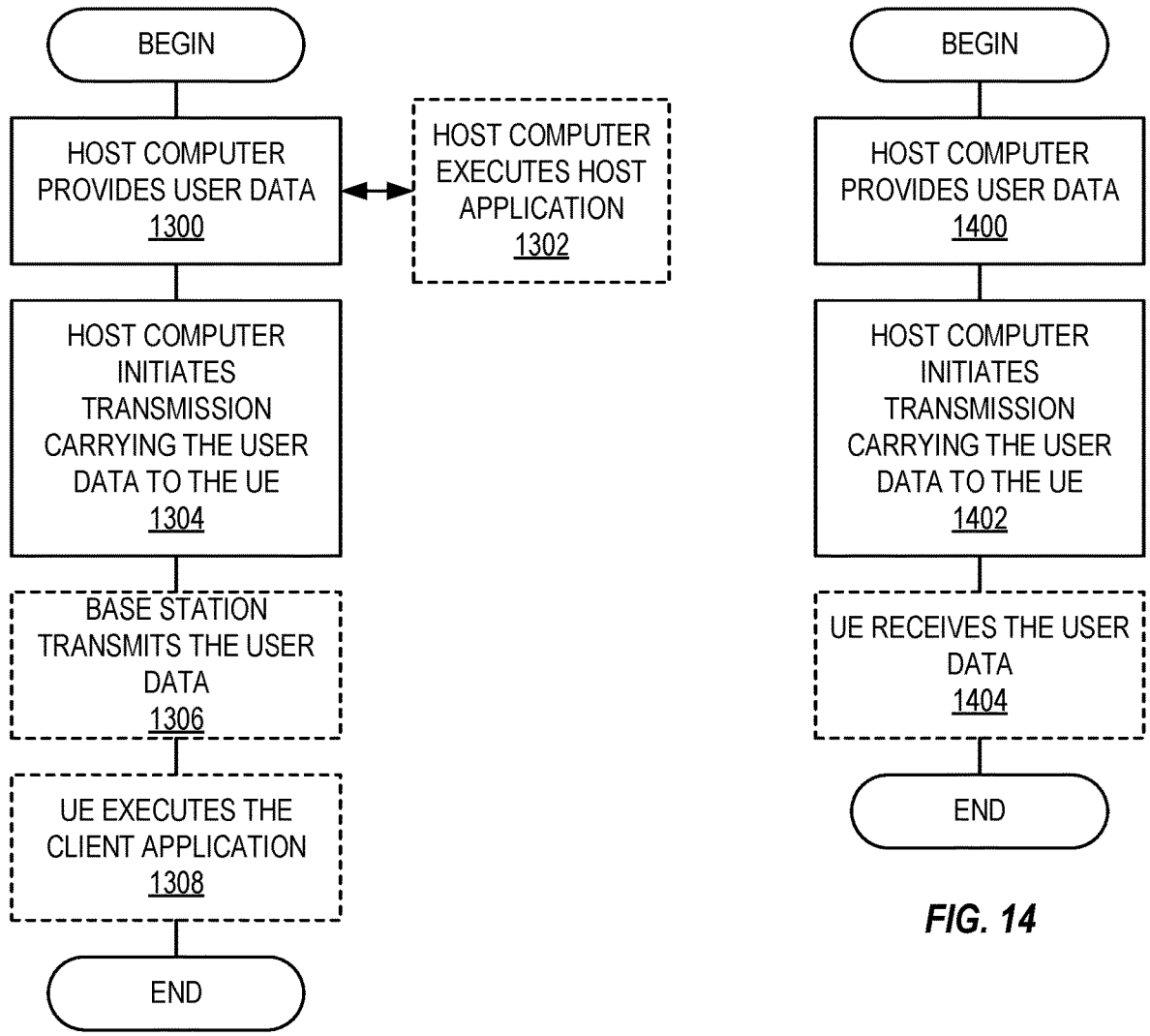

NON-TERRESTRIAL SINGLE FREQUENCY NETWORK

RELATED APPLICATIONS

This application is a national stage application of International Patent Application No. PCT/IB2020/054167, filed May 1, 2020, which claims the benefit of provisional patent application Ser. No. 62/841,280, filed May 1, 2019, the disclosure of are hereby incorporated herein by reference in their entirety.

TECHNICAL FIELD

The present disclosure relates to a telecommunications networks and, in particular, to non-terrestrial networks.

BACKGROUND

In 3GPP Release 8, Evolved Packet System (EPS) was specified. EPS is based on the Long-Term Evolution (LTE) radio network and the Evolved Packet Core (EPC). It was originally intended to provide voice and mobile broadband (MBB) services but has continuously evolved with broadening functionality. Since 3GPP Release 13, NB -IoT (Narrowband Internet-of-Things) and LTE-M (LTE-Cat M1) are part of the LTE specifications for providing connectivity to massive machine type communications (mMTC) services.

In 3GPP Release 15, the first release of the 5G system (5GS) was developed. The 5GS is a new generation radio access technology intended to serve use cases such as enhanced mobile broadband (eMBB), ultra-reliable and low latency communication (URLLC), and mMTC. 5G includes New Radio (NR) access stratum interface and 5G Core Network (5GC). The NR physical and higher layers are reusing parts of the LTE specification and add needed components when motivated by the new use cases.

Synchronization

LTE, NB-IoT and NR follow a similar concept for the downlink synchronization signals. A Primary Synchronization Signal (PSS) allows a device to synchronize in time and frequency to the network. In the case of NB-IoT, a single Narrowband PSS (NPSS) is defined. In the case of LTE and NR, three different PSS realizations are supported. For LTE and NR, the PSS signals are provided in the first part of the physical cell identity (PCID).

The Secondary Synchronization Signal (SSS) supports identification of the full PCID. In the case of NB-IoT, the NSSS alone identifies the complete PCID (and also signal frame timing information). For LTE and NR, the SSS complements the PSS and signals the second part of the PCID.

For NB-IoT the synchronization, signals are mapped on the subframes of a specific carrier of 180 kHz bandwidth known as the anchor carrier. For LTE the synchronization, signals are mapped to the center 62 subcarrier of the LTE system bandwidth. Each LTE subcarrier has a width of 15 kHz. For NR, the synchronization signals (SS) are mapped on the so-called SS/PBCH-block which can be configured flexibly in the NR system bandwidth. The NR PSS and SSS span across 127 subcarriers, each with a width of 15, 30, 120 or 240 kHz. For NR, a single cell can be associated with one or more transmit and receive beams Each transmit beam, which carries a SS/PBCH block, can be associated to a SS/PBCH block index. A receive beam pointing in the same spatial direction as a transmit beam can also be associated with the SS/PBCH index of the transmit beam. In this disclosure, the SS/PBCH block index is also referred to as the term beam index.

Random Access

LTE, NB-IoT, and NR all support random access by means of PRACH preamble transmissions. For LTE and NR, the preamble is defined by a Zadoff-Chu sequence. For NB-IoT, the preamble is defined by a frequency hopping sinusoidal waveform. In all three cases, the network configures the periodically occurring time-frequency resources in which UEs may trigger preamble transmission.

Positioning

LTE and NB-IoT support time difference of arrival (TDOA)-based positioning. Downlink TDOA is based on Positioning Reference Signal (PRS) transmissions. Uplink TDOA is based on Sounding Reference Signal (SRS) transmissions. In the case of DL TDOA, a UE receives PRS transmissions from multiple base station transmitters and calculates the TDOA between the received PRS instances and signals the measured TDOAs back to the network. In the case of UL TDOA, a single UE transmits an SRS that is received by multiple base stations. The network calculates the TDOA between the SRS received by the different base stations. Based on the measured TDOAs and the known positions of the base stations, the network can determine the position of the UE by means of multilateration.

SC-PTM

LTE-M and NB-IoT support Single-Cell Point to Multipoint (SC-PTM) broadcast and multicast. SC-PTM defines a new system information message (SIB20) and two logical channels, namely the SC-MCCH and the SC-MTCH. The SC MCCH provides the SC-MTCH configuration, while the SC-MTCH carries the multicast service.

SIB20, SC-MCCH and SC-MTCH are transmitted on the PDSCH. SIB20 is transmitted in periodically occurring time and frequency resources that are signaled to the device in SIB1. The SIB20 configures SC-MCCH reception that is scheduled by a (M/N)PDCCH sent in a Type 1A Common search space (CSS) and is scrambled by the Single cell RNTI (SC-RNTI). The SC-MTCH PDSCH is scheduled by a (M/N)PDCCH sent in a Type 2A CSS and is scrambled by a group RNTI (G-RNTI).

NTN

In Release 15 3GPP started the work to prepare NR for operation in a Non-Terrestrial Network (NTN). The work was performed within the study item "NR to support Non-Terrestrial Networks" and resulted in TR 38.811. In Release 16 the work to prepare NR for operation in an NTN network continues with the study item "Solutions for NR to support Non-Terrestrial Network".

In parallel, the interest to adapt LTE for operation in NTN is growing. A satellite radio access network usually includes the following components:
- A satellite that refers to a space-borne platform.
- An earth-based gateway that connects the satellite to a base station or a core network, depending on the choice of architecture.

Feeder link that refers to the link between a gateway and a satellite.

Service link or access link that refers to the link between a satellite and a UE.

The Bent pipe transponder architecture and the Regenerative transponder architecture may be considered as two popular architectures as of today. In the Bent pipe transponder architecture, the base station is located on earth behind the gateway, and the satellite operates as a repeater forwarding the feeder link signal to the service link, and vice versa. In the Regenerative transponder architecture, the satellite is in the base station and the service link connects it to the earth-based core network.

Depending on the orbit altitude, a satellite may be categorized as low earth orbit (LEO), medium earth orbit (MEO), or geostationary earth orbit (GEO) satellite.

LEO: typical heights ranging from 250-1,500 km, with orbital periods ranging from 90-120 minutes.

MEO: typical heights ranging from 5,000-25,000 km, with orbital periods ranging from 3-15 hours.

GEO: height at about 35,786 km, with an orbital period of 24 hours.

A communication satellite typically generates several beams over a given area. The footprint of a beam is usually in an elliptic shape, which has been traditionally considered as a cell. The footprint of the beam is also often referred to as a spotbeam. The spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers. FIG. 1 shows an exemplary architecture of a satellite network with bent pipe transponders.

In contrast to the beams observed in a terrestrial network, the NTN beam may be very wide and cover an area outside of the area defined by the served cell. Beam covering adjacent cells may overlap. Since a single satellite supports multiple beams the transmissions are time synchronized. The synchronization applies not only at the satellite transmitter, but also at the device receiver.

FIG. 2 presents an exemplary experienced path gain between a UE and GEO satellite for three overlapping beams (or cells). The gain is shown for a measurement trace during which the UE moves 350 km on the surface of earth. The difference in path gain between the three beams corresponds to the antenna gain generated for each of the three beams in the direction of the UE. As illustrated in FIG. 2, the gain difference between two beams may not exceed 5 dB.

BRIEF DESCRIPTION OF THE DRAWINGS

Aspects of the present disclosure may be understood by reference to the following description of figures included in the drawings of the disclosure.

FIG. 13 is a flowchart illustrating a method implemented in a communication system, according to some embodiments of the present disclosure.

FIG. 14 is a flowchart illustrating a method implemented in a communication system, according to some embodiments of the present disclosure.

Figure 1:
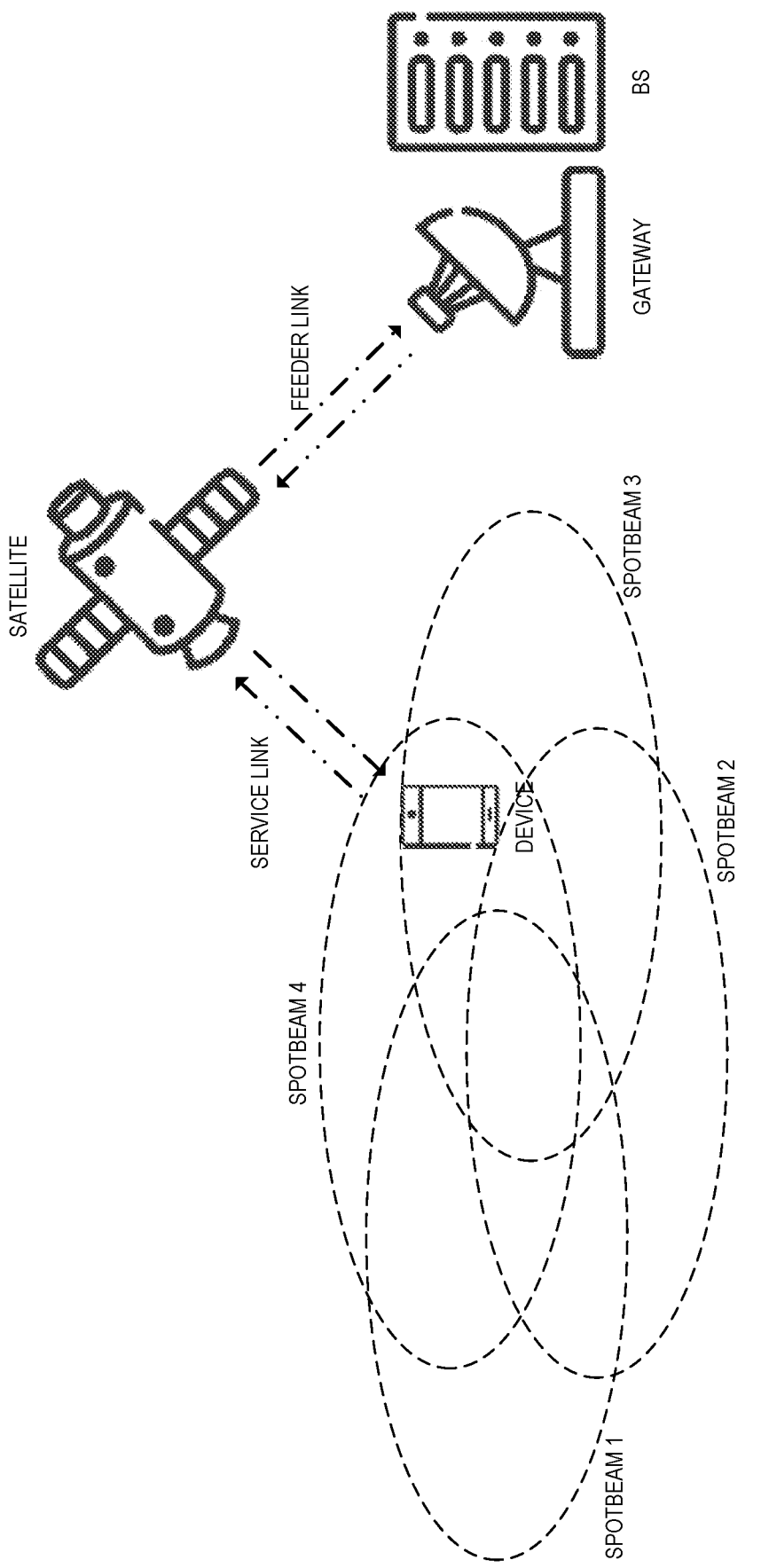
FIG. 1 shows an exemplary architecture of a satellite network with bent pipe transponders.
Figure 2:
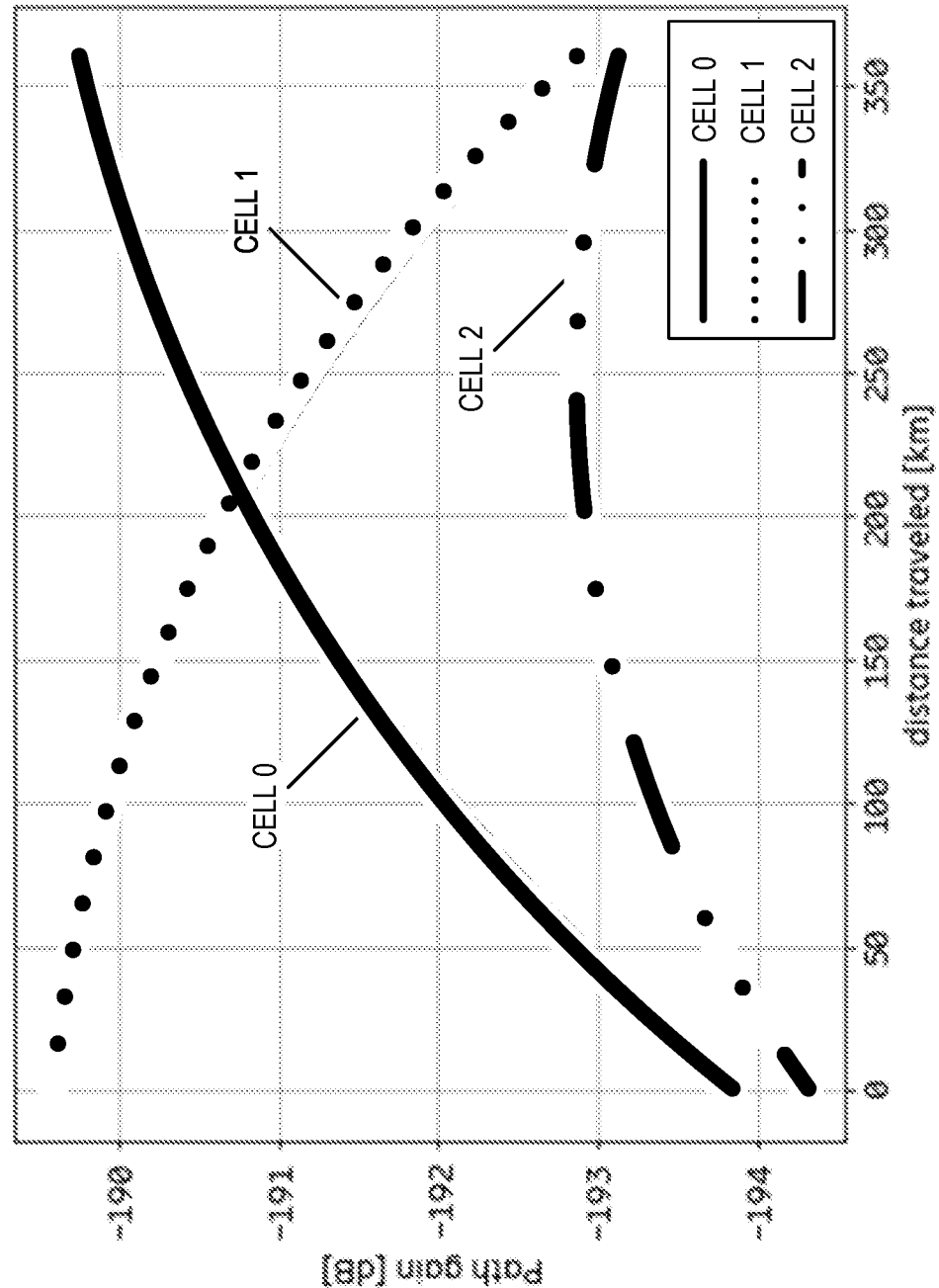
FIG. 2 presents an exemplary experienced path gain between a UE and GEO satellite for three overlapping beams (or cells) according to some embodiments of the present disclosure.

These figures may be better understood when viewed in light of the following additional description.

DETAILED DESCRIPTIONS

There currently exist certain challenge(s) with NTNs. The overlap between adjacent beams/cells is problematic since it sets an upper bound on the C/I (carrier-to-interference ratio) experienced in a loaded NTN. This may negatively impact the link level as well as the system level performance Certain aspects of the present disclosure and their embodiments may provide solutions to the aforementioned or other challenges. Embodiments of a set of methods that may turn the NTN into a single frequency network in which the overlap of the beams may become advantageous are disclosed. Compared to a terrestrial single frequency network, the NTN transmissions are not only time synchronized at the transmitting side but also at the receiving side. This fact, which applies both to the uplink and downlink, is exploited to enable performance improvements in such aspects as synchronization, random access, and positioning reference signals, which is not feasible in a terrestrial cellular network.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network or any node that implements a core network function. Some examples of a core network node include, e.g., a Mobility Management Entity (MME), a Packet Data Network Gateway (PGW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
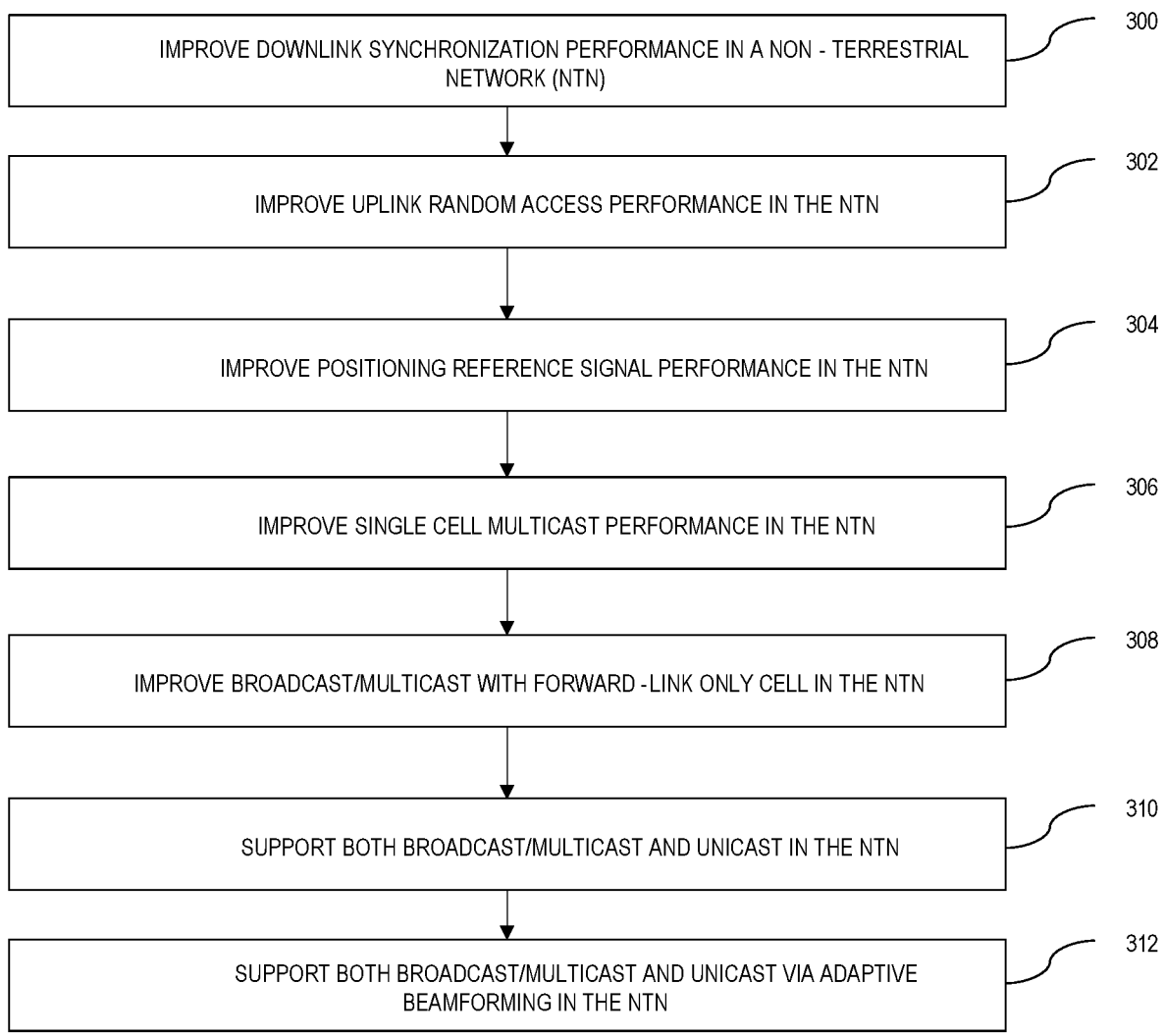
FIG. 3 is a flowchart that illustrates the operation of a wireless device (e.g., a UE) configured according to some embodiments of the present disclosure to improve link level performance in a non-terrestrial network (NTN).

There are, proposed herein, various embodiments which address one or more of the issues disclosed herein. Before describing some example embodiments in detail, FIG. 3 is a flowchart that illustrates the operation of a wireless device (e.g., a UE) configured according to some embodiments of the present disclosure to improve link level performance in a non-terrestrial network (NTN). The wireless device may be configured to improve downlink synchronization performance in the NTN (block 300). The wireless device may be further configured to improve uplink random access performance in the NTN (block 302). The wireless device may be further configured to improve positioning reference signal performance in the NTN (block 304). The wireless device may be further configured to improve single cell multicast performance in the NTN (block 306). The wireless device may be further configured to improve broadcast/multicast with forward-link only cell in the NTN (block 308). The wireless device may be further configured to support both broadcast/multicast and unicast in the NTN (block 310). The wireless device may be further configured to support both broadcast/multicast and unicast via adaptive beamforming in the NTN (block 312).

Figure 4:
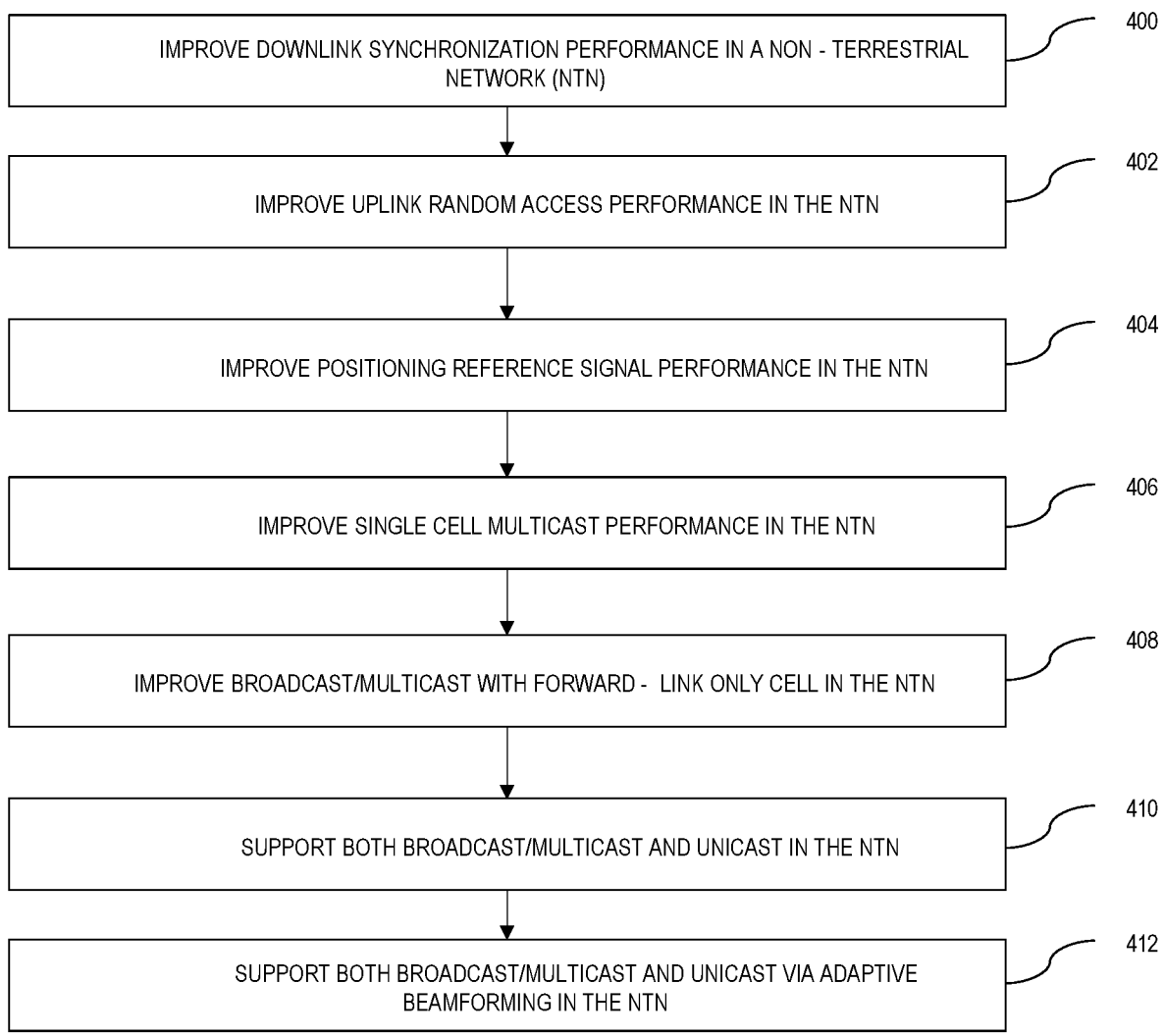
FIG. 4 is a flowchart that illustrates the operation of a base station configured according to some embodiments of the present disclosure.

FIG. 4 is a flowchart that illustrates the operation of a base station configured according to some embodiments of the present disclosure to improve link level performance in a non-terrestrial network (NTN). The base station may be configured to improve downlink synchronization performance in the NTN (block 400). The base station may be further configured to improve uplink random access performance in the NTN (block 402). The base station may be further configured to improve positioning reference signal performance in the NTN (block 404). The base station may be further configured to improve single cell multicast performance in the NTN (block 406). The base station may be further configured to improve broadcast/multicast with forward-link only cell in the NTN (block 408). The base station may be further configured to support both broadcast/multicast and unicast in the NTN (block 410). The base station may be further configured to support both broadcast/multicast and unicast via adaptive beamforming in the NTN (block 412). Note that while FIG. 4 includes blocks 400 through 412, the method of operation of the base station may include any one or more of the blocks 400 through 412. In other words, the method performed by the base station may include, but does not necessarily include, all of the blocks illustrated in FIG. 4. Rather, the method may include any one of the blocks 400 to 412 or any combination of two or more of the blocks 400 to 412.

Certain embodiments may provide one or more of the following technical advantage(s). The advantage of the present disclosure is to exploit overlapping beams in an NTN to increase received downlink and uplink signal strengths to improve link level performance Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 5:
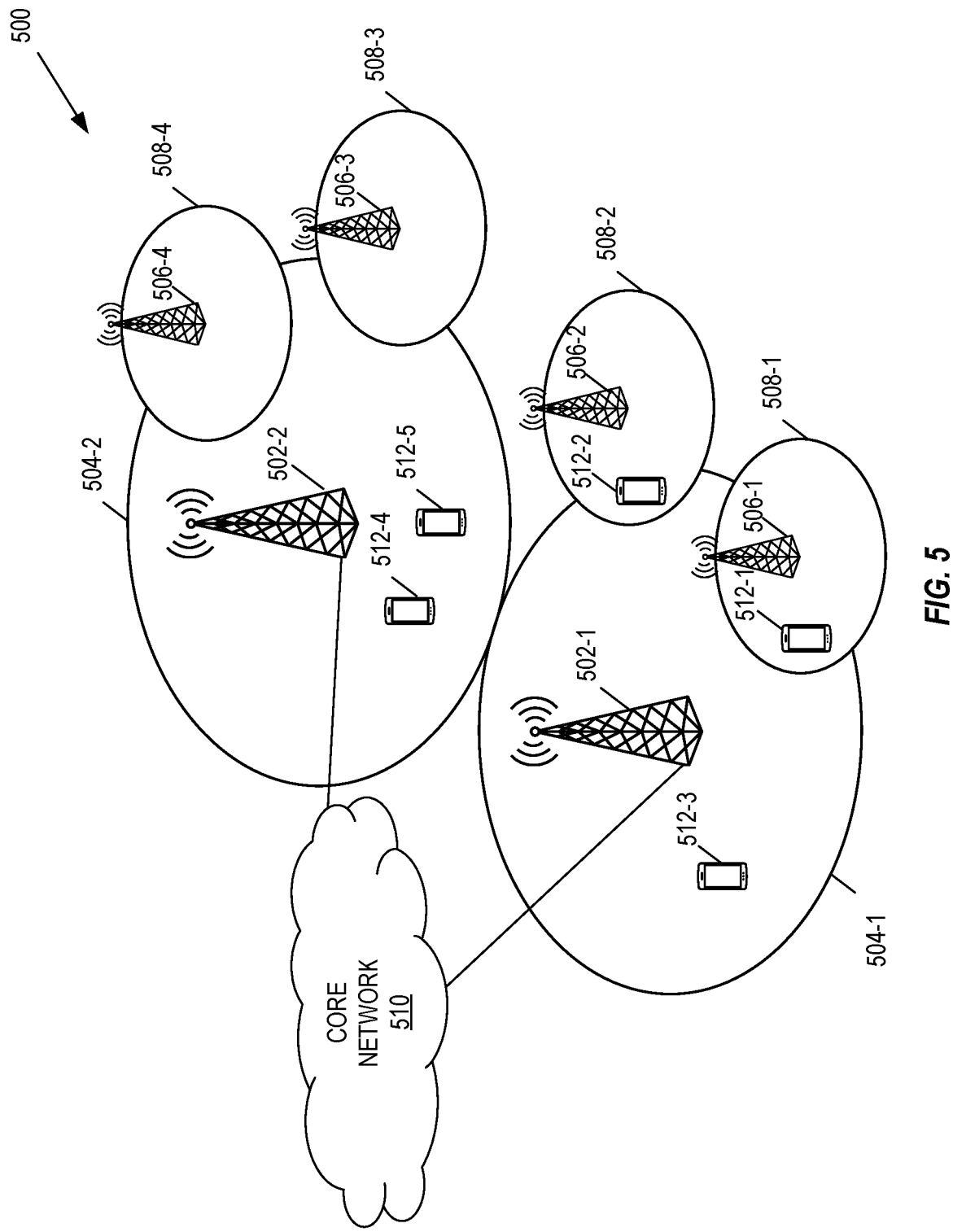
FIG. 5 illustrates one example of a cellular communications network according to some embodiments of the present disclosure.

FIG. 5 illustrates one example of a cellular communications network 500 according to some embodiments of the present disclosure. In the embodiments described herein, the cellular communications network 500 is a 5G NR network. In this example, the cellular communications network 500 includes base stations 502-1 and 502-2, which in LTE are referred to as eNBs and in 5G NR are referred to as gNBs, controlling corresponding macro cells 504-1 and 504-2. The base stations 502-1 and 502-2 are generally referred to herein collectively as base stations 502 and individually as base station 502. Likewise, the macro cells 504-1 and 504-2 are generally referred to herein collectively as macro cells 504 and individually as macro cell 504. The cellular communications network 500 may also include a number of low power nodes 506-1 through 506-4 controlling corresponding small cells 508-1 through 508-4. The low power nodes 506-1 through 506-4 can be small base stations (such as pico or femto base stations) or Remote Radio Heads (RRHs), or the like. Notably, while not illustrated, one or more of the small cells 508-1 through 508-4 may alternatively be provided by the base stations 502. The low power nodes 506-1 through 506-4 are generally referred to herein collectively as low power nodes 506 and individually as low power node 506. Likewise, the small cells 508-1 through 508-4 are generally referred to herein collectively as small cells 508 and individually as small cell 508. The base stations 502 (and optionally the low power nodes 506) are connected to a core network 510.

The base stations 502 and the low power nodes 506 provide service to wireless devices 512-1 through 512-5 in the corresponding cells 504 and 508. The wireless devices 512-1 through 512-5 are generally referred to herein collectively as wireless devices 512 and individually as wireless device 512. The wireless devices 512 are also sometimes referred to herein as UEs.

Methods Improving Downlink Synchronization Performance

In a first embodiment, an NTN satellite configures the NB-IoT NPSS transmissions in multiple spot beams to be overlapping in time and frequency.

In one embodiment, an NTN satellite configures LTE PSS transmissions, which supports the same Zadoff-Chu root index configured to define the LTE PSS transmission, in multiple beams to be overlapping in time and frequency.

In one embodiment, when one SS/PBCH spot beam is mapped to a cell, an NTN satellite configures NR PSS transmissions, which supports the same shift of the length 127 M-sequence configured to define the NR PSS, in multiple beams to be overlapping in time and frequency.

In one embodiment, when N SS/PBCH spot beams (N>1) are mapped to a cell, an NTN satellite configures NR PSS transmissions, which supports the same shift of the length 127 M-sequence configured to define the NR PSS, in multiple beams that share the same SS/PBCH block index to be overlapping in time and frequency.

The joint transmission in overlapping time and frequency resources of the PSS across the configured beams increases the NTN antenna gain for the PSS and consequently the Equivalent Isotropically Radiated Power (EIRP), and can reduce the path loss between the satellite and the UE.

Methods Improving Uplink Random Access Performance

In one embodiment, an NTN satellite configures LTE, NB-IoT and NR PRACH time-frequency resources that are overlapping in a set of spot beams In the case of NR where one SS/PBCH spot beam is mapped to a cell, the set of spot beams can be any or all beams In the case of NR where N SS/PBCH spot beams (N>1) are mapped to a cell, the set of spot beams can be beams that are associated to the same SS/PBCH block index.

As a UE transmits its PRACH this will allow the network to receive the PRACH in overlapping time-frequency resources on overlapping beams thereby increasing the receive antenna gain compared to if the PRACH was received in a single beam.

Methods Improving Positioning Reference Signal Performance

In one embodiment, an NTN satellite configures an LTE and NB-IoT PRS time-frequency resources that are overlapping in a set of spot beams. The joint transmission of the PRS across the configured beams increases the PRS EIRP and may reduce the path loss between the satellite and the UE.

In one embodiment, an NTN satellite configures an LTE SRS time-frequency resources that are overlapping in a set of spot beams. As a UE transmits a respective SRS, the SRS configuration overlapping in time and frequency across the set of configured beams may allow the network to receive the SRS in all configured beams, thus increasing the receive antenna gain compared to the case in which the SRS was received in a single beam.

Note that to determine the position of the UE by means of multilateration, at least three satellites need to receive the SRS or transmit the PRS to the UE.

Though reference signals for positioning in NR have not been fully determined yet, the above method can be straightforwardly extended to NR. For example, an NTN satellite can configure reference signals for positioning to be in overlapping time-frequency resources in a set of beams to exploit joint transmission to increase the reference signal EIRP and reduce its path loss.

Methods Improving Single Cell Multicast Performance

In one embodiment, an NTN satellite configures an LTE and NB-IoT SC-PTM SIB20, SC-MCCH and SC-MTCH transmissions on (M/N)PDCCH and (N)PDSCH time-frequency resources that are overlapping in a set of spot beams The NTN satellite configures the Type 1A and Type 2A CSS identically in all beams. The same G-RNTI across all beams may be used for SC-MTCH transmissions to the same group of UEs.

For (M/N)PDCCH and (N)PDSCH transmissions, the NTN satellite may apply the same bit and resource element level scrambling across all spot beams In this regard, for the SC-PTM, the NTN satellite may need to configure a single cell identify for all SC-PTM transmissions across the set of targeted spot beams. The SC-PTM single cell identity may need to be signaled to all UEs receiving the SC-PTM transmissions. Note that the single cell identity is not equivalent to PCID, but is an identity that may be configured by higher layers.

Though SC-PTM in NR has not been designed yet, the above method can be straightforwardly extended to NR. For example, an NTN satellite can configure:
  PDCCH and PDSCH time-frequency resources used for SC-PTM related transmissions to be overlapping in a set of spot beams
  CSS configurations for SC-PTM are identical and same RNTIs are used in a set of spot beams
  PDCCH and PDSCH bit and resource element level scrambling are identical in a set of spot beams

Methods Improving Broadcast/Multicast With Forward-Link Only Cell

In one embodiment, an NTN satellite uses a two-tier architecture, wherein tier 1 includes one or more forward-link only cells for broadcast/multicast and tier 2 includes normal cells supporting bi-directional links For a broadcast/ multicast cell, all transmissions of the same type (e.g., SS/PBCH/PDCCH/PDSCH/CSI-RS in case of NR) are overlapping in a set of beams. Notably, a broadcast/multicast cell may have only forward link As such, the broadcast/multicast cell may explicitly signal this limitation in system information or implicitly signal the limitation by, for example, not configuring PRACH resource to prevent UE from initiating random access in the cell.

Methods for Supporting Both Broadcast/Multicast and Unicast

In one embodiment, a first set of beams is used to transmit SS/PBCH as well as other physical channels used for system information acquisition and setting up a data session in connected mode, including PRACH, PUSCH (for Message-3) PDCCH (for scheduling PDSCH), and PDSCH (SIB1 as well as other system information blocks, and Message-2). These physical channels are configured for joint transmission in the first set of beams.

Additionally, the CSI-RS is transmitted in a second set of beams, wherein each second set of beams may be a subset of the first set of the beams. The CSI-RS is used for the UE to measure which second set of beams within the first set of beams has the best signal strength or quality. The UE then reports the CSI-RS measurements to the network. Based on the UE's CSI-RS measurement report, the network may proceed with the subsequent unicast data session with the UE using a second set of the beams that is deemed the best for the UE.

A first set of beams may include all the 4 beams shown in FIG. 1 (e.g., beam indexes {1, 2, 3, 4}), while a second set of the beams may include each individual beam (e.g., beam indexes {1}, {2}, {3}, or {4}).

Adaptive beamforming for supporting both broadcast/multicast and unicast

This embodiment is similar to the embodiment described above, except that the first set and the second set of beams are replaced by the first and the second beam patterns, respectively. For example, the first beam pattern covers the same area jointly covered by beams 1, 2, 3, and 4 in FIG. 1, and the second beam pattern is the same as what is shown in FIG. 1 (e.g., each beam covers an area and there are overlaps between areas covered by different beams). The beam patterns are time switching. Thus, the first beam pattern is used in the time intervals when SSB as well as other physical channels used for system information acquisition and setting up a data session in connected mode are transmitted. As these channels may not occupy the entire carrier bandwidth, there could be some resource elements left unused.

The CSI-RS is transmitted using the second beam pattern and is used to facilitate the selection of a suitable beam to serve the UE using the second beam pattern. The network proceeds with the subsequent unicast data session with the UE using a beam that is deemed the best for the UE based on the second beam pattern.

Figure 6:
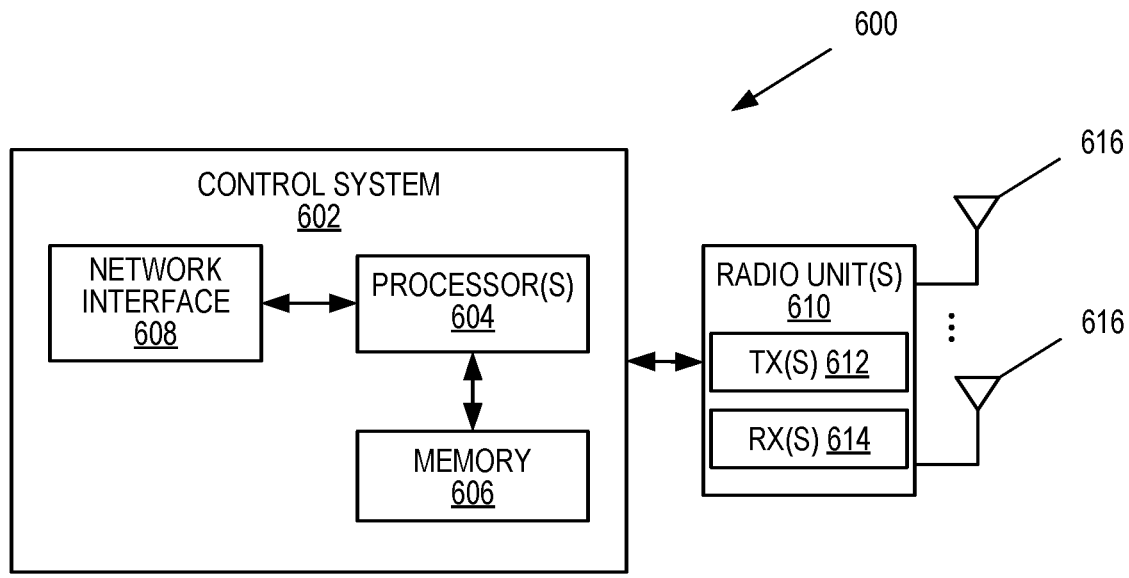
FIG. 6 is a schematic block diagram of a radio access node according to some embodiments of the present disclosure.

FIG. 6 is a schematic block diagram of a radio access node 600 according to some embodiments of the present disclosure. The radio access node 600 may be, for example, a base station 502 or 506. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry.

In addition, the radio access node 600 includes one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
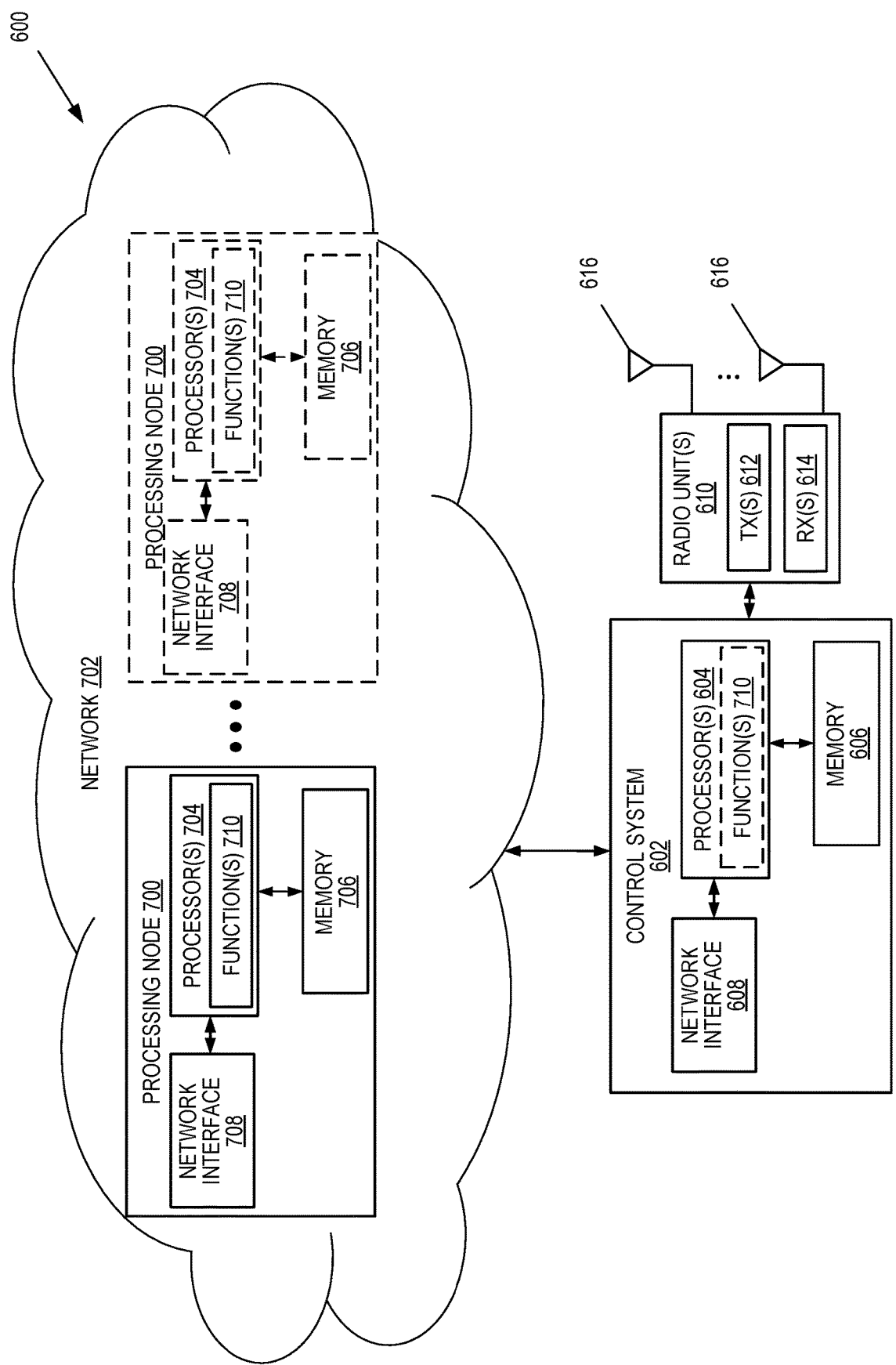
FIG. 7 is a schematic block diagram that illustrates a virtualized embodiment of the radio access node of FIG. 6 according to some embodiments of the present disclosure.

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 includes the control system 602 that includes the one or more processors 604 (e.g., CPUs, ASICs, FPGAs, and/or the like), the memory 606, and the network interface 608 and the one or more radio units 610 that each includes the one or more transmitters 612 and the one or more receivers 614 coupled to the one or more antennas 616, as described above. The control system 602 is connected to the radio unit(s) 610 via, for example, an optical cable or the like. The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the radio access node 600 described herein are implemented at the one or more processing nodes 700 or distributed across the control system 602 and the one or more processing nodes 700 in any desired manner In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
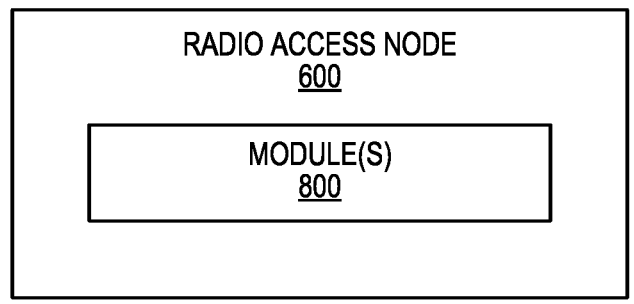
FIG. 8 is a schematic block diagram of the radio access node of FIG. 6 according to some other embodiments of the present disclosure.

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
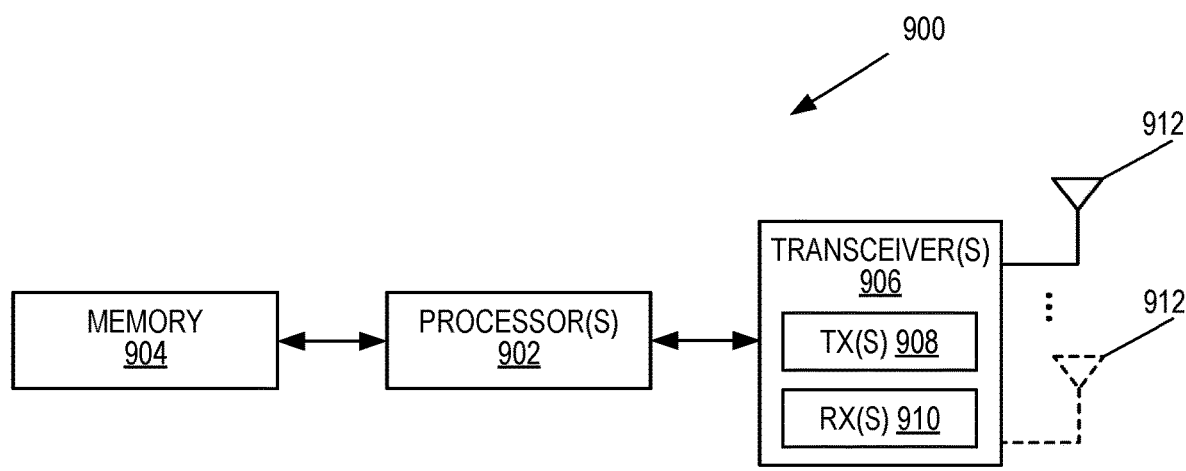
FIG. 9 is a schematic block diagram of a UE according to some embodiments of the present disclosure.

FIG. 9 is a schematic block diagram of a UE 900 according to some embodiments of the present disclosure. As illustrated, the UE 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912.

The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 900 and/or allowing output of information from the UE 900), a power supply (e.g., a battery and associated power circuitry), etc.

In some embodiments, a computer program including instructions which, when executed by at least one processor, causes the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
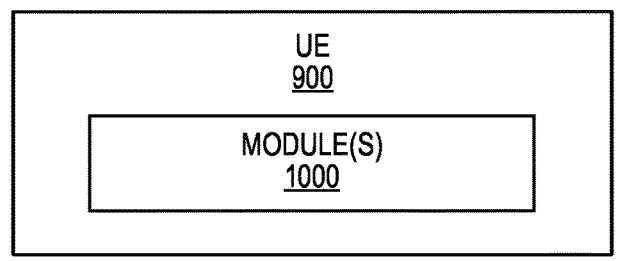
FIG. 10 is a schematic block diagram of the UE of FIG. 9 according to some other embodiments of the present disclosure.

FIG. 10 is a schematic block diagram of the UE 900 according to some other embodiments of the present disclosure. The UE 900 includes one or more modules 1000, each of which is implemented in software. The module(s) 1000 provide the functionality of the UE 900 described herein.

Figure 11:
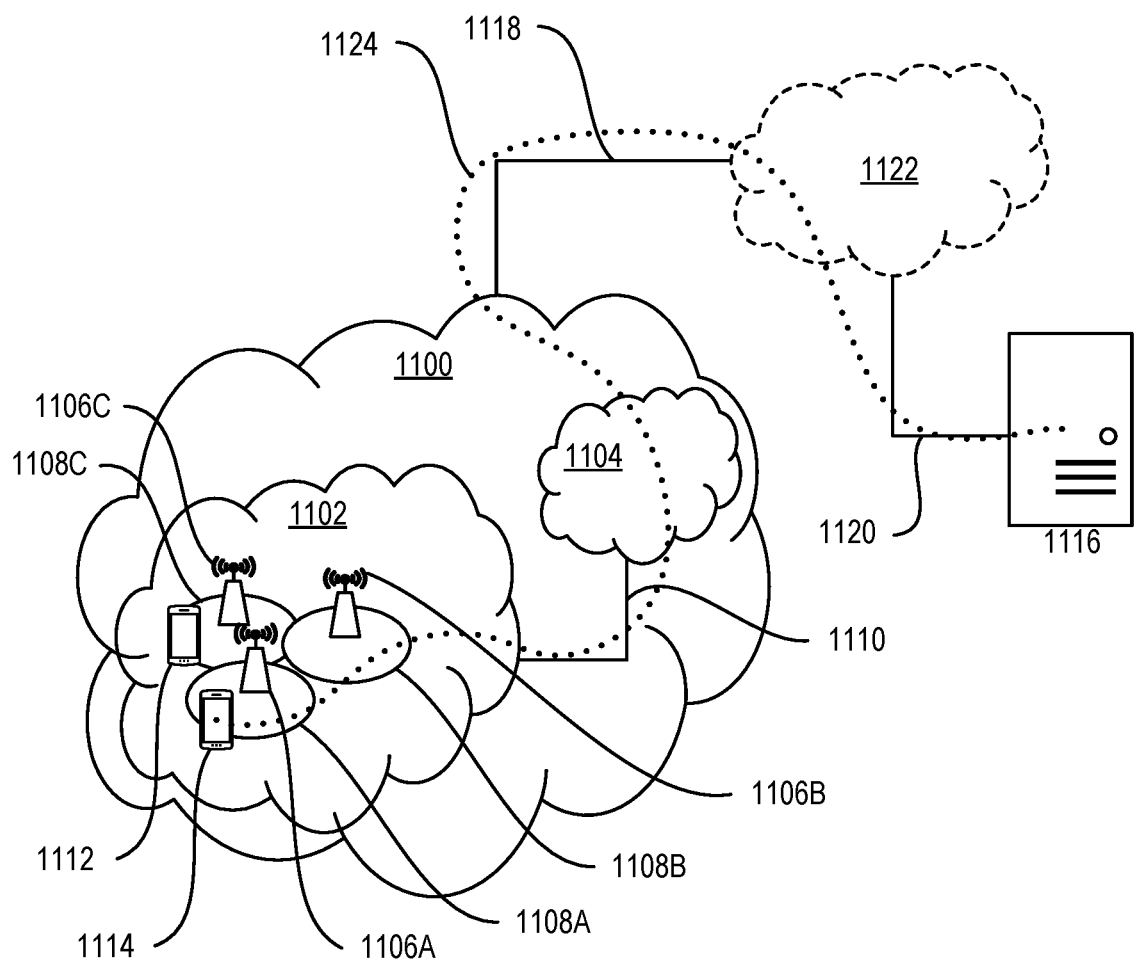
FIG. 11 depicts a communication system that includes a telecommunication network, which comprises an access network, such as a RAN, and a core network, according to some embodiments of the present disclosure.

With reference to FIG. 11, in accordance with an embodiment, a communication system includes a telecommunication network 1100, such as a 3GPP-type cellular network, which comprises an access network 1102, such as a RAN, and a core network 1104. The access network 1102 comprises a plurality of base stations 1106A, 1106B, 1106C, such as NB s, eNBs, gNBs, or other types of wireless Access Points (APs), each defining a corresponding coverage area 1108A, 1108B, 1108C. Each base station 1106A, 1106B, 1106C is connectable to the core network 1104 over a wired or wireless connection 1110. A first UE 1112 located in coverage area 1108C is configured to wirelessly connect to, or be paged by, the corresponding base station 1106C. A second UE 1114 in coverage area 1108A is wirelessly connectable to the corresponding base station 1106A. While a plurality of UEs 1112, 1114 are illustrated in this example, the disclosed embodiments are equally applicable to a situation where a sole UE is in the coverage area or where a sole UE is connecting to the corresponding base station 1106.

The telecommunication network 1100 is itself connected to a host computer 1116, which may be embodied in the hardware and/or software of a standalone server, a cloud-implemented server, a distributed server, or as processing resources in a server farm. The host computer 1116 may be under the ownership or control of a service provider, or may be operated by the service provider or on behalf of the service provider. Connections 1118 and 1120 between the telecommunication network 1100 and the host computer 1116 may extend directly from the core network 1104 to the host computer 1116 or may go via an optional intermediate network 1122. The intermediate network 1122 may be one of, or a combination of more than one of, a public, private, or hosted network; the intermediate network 1122, if any, may be a backbone network or the Internet; in particular, the intermediate network 1122 may comprise two or more sub-networks (not shown).

The communication system of FIG. 11 as a whole enables connectivity between the connected UEs 1112, 1114 and the host computer 1116. The connectivity may be described as an Over-the-Top (OTT) connection 1124. The host computer 1116 and the connected UEs 1112, 1114 are configured to communicate data and/or signaling via the OTT connection 1124, using the access network 1102, the core network 1104, any intermediate network 1122, and possible further infrastructure (not shown) as intermediaries. The OTT connection 1124 may be transparent in the sense that the participating communication devices through which the OTT connection 1124 passes are unaware of routing of uplink and downlink communications. For example, the base station 1106 may not or need not be informed about the past routing of an incoming downlink communication with data originating from the host computer 1116 to be forwarded (e.g., handed over) to a connected UE 1112. Similarly, the base station 1106 need not be aware of the future routing of an outgoing uplink communication originating from the UE 1112 towards the host computer 1116.

Example implementations, in accordance with an embodiment, of the UE, base station, and host computer discussed in the preceding paragraphs will now be described with reference to FIG. 12. In a communication system 1200, a host computer 1202 comprises hardware 1204 including a communication interface 1206 configured to set up and maintain a wired or wireless connection with an interface of a different communication device of the communication system 1200. The host computer 1202 further comprises processing circuitry 1208, which may have storage and/or processing capabilities. In particular, the processing circuitry 1208 may comprise one or more programmable processors, ASICs, FPGAs, or combinations of these (not shown) adapted to execute instructions. The host computer 1202 further comprises software 1210, which is stored in or accessible by the host computer 1202 and executable by the processing circuitry 1208. The software 1210 includes a host application 1212. The host application 1212 may be operable to provide a service to a remote user, such as a UE 1214 connecting via an OTT connection 1216 terminating at the UE 1214 and the host computer 1202. In providing the service to the remote user, the host application 1212 may provide user data which is transmitted using the OTT connection 1216.

The communication system 1200 further includes a base station 1218 provided in a telecommunication system and comprising hardware 1220 enabling it to communicate with the host computer 1202 and with the UE 1214. The hardware 1220 may include a communication interface 1222 for setting up and maintaining a wired or wireless connection with an interface of a different communication device of the communication system 1200, as well as a radio interface 1224 for setting up and maintaining at least a wireless connection 1226 with the UE 1214 located in a coverage area (not shown in FIG. 12) served by the base station 1218. The communication interface 1222 may be configured to facilitate a connection 1228 to the host computer 1202. The connection 1228 may be direct or it may pass through a core network (not shown in FIG. 12) of the telecommunication system and/or through one or more intermediate networks outside the telecommunication system. In the embodiment shown, the hardware 1220 of the base station 1218 further includes processing circuitry 1230, which may comprise one or more programmable processors, ASICs, FPGAs, or combinations of these (not shown) adapted to execute instructions. The base station 1218 further has software 1232 stored internally or accessible via an external connection.

The communication system 1200 further includes the UE 1214 already referred to. The UE's 1214 hardware 1234 may include a radio interface 1236 configured to set up and maintain a wireless connection 1226 with a base station serving a coverage area in which the UE 1214 is currently located. The hardware 1234 of the UE 1214 further includes processing circuitry 1238, which may comprise one or more programmable processors, ASICs, FPGAs, or combinations of these (not shown) adapted to execute instructions. The UE 1214 further comprises software 1240, which is stored in or accessible by the UE 1214 and executable by the processing circuitry 1238. The software 1240 includes a client application 1242. The client application 1242 may be operable to provide a service to a human or non-human user via the UE 1214, with the support of the host computer 1202. In the host computer 1202, the executing host application 1212 may communicate with the executing client application 1242 via the OTT connection 1216 terminating at the UE 1214 and the host computer 1202. In providing the service to the user, the client application 1242 may receive request data from the host application 1212 and provide user data in response to the request data. The OTT connection 1216 may transfer both the request data and the user data. The client application 1242 may interact with the user to generate the user data that it provides.

Figure 12:
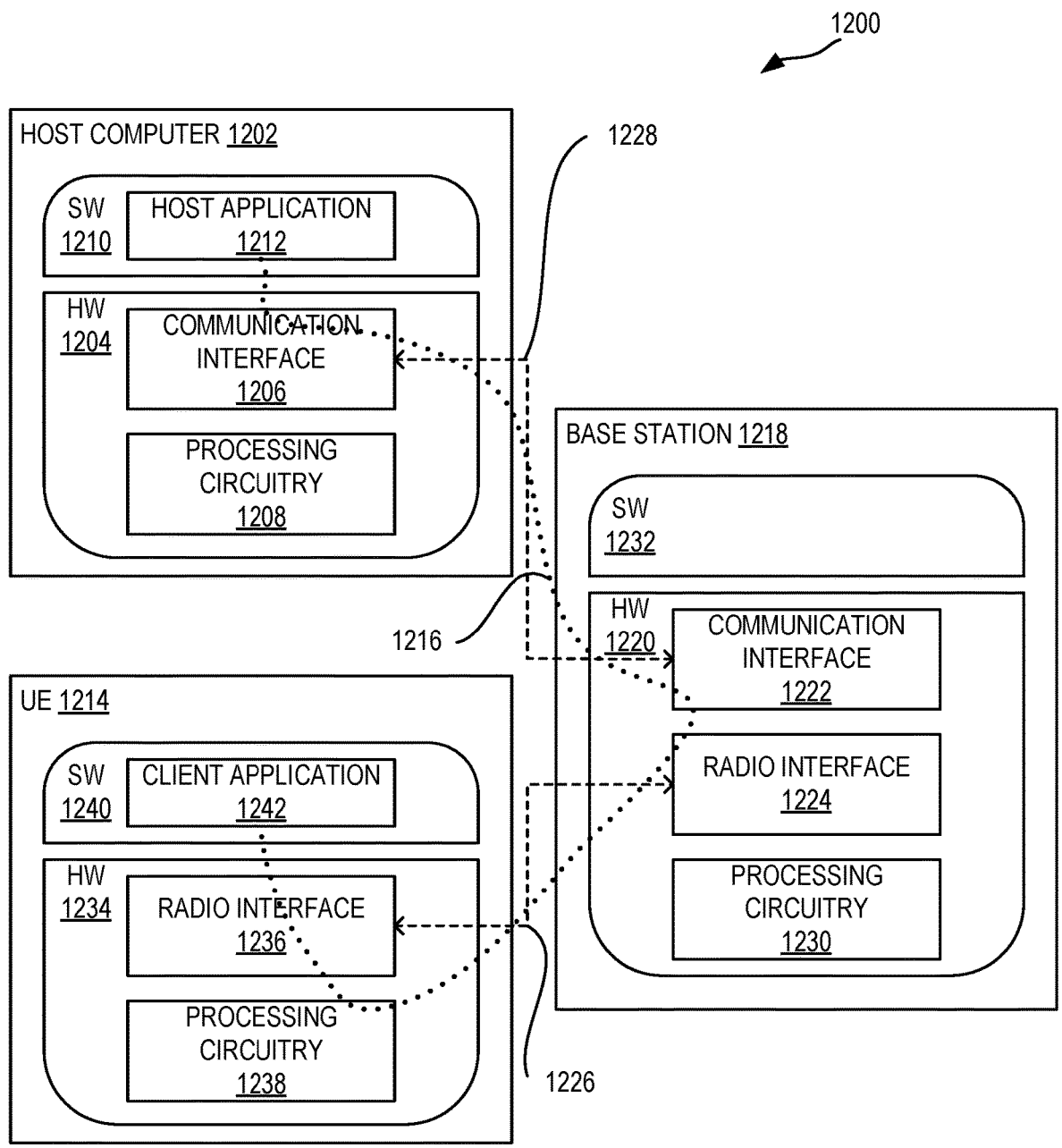
FIG. 12 depicts an implementation that includes a UE, a base station, and a host computer according to some embodiments of the present disclosure.

It is noted that the host computer 1202, the base station 1218, and the UE 1214 illustrated in FIG. 12 may be similar or identical to the host computer 1116, one of the base stations 1106A, 1106B, 1106C, and one of the UEs 1112, 1114 of FIG. 11, respectively. This is to say, the inner workings of these entities may be as shown in FIG. 12 and independently, the surrounding network topology may be that of FIG. 11.

In FIG. 12, the OTT connection 1216 has been drawn abstractly to illustrate the communication between the host computer 1202 and the UE 1214 via the base station 1218 without explicit reference to any intermediary devices and the precise routing of messages via these devices. The network infrastructure may determine the routing, which may be configured to hide from the UE 1214 or from the service provider operating the host computer 1202, or both.

While the OTT connection 1216 is active, the network infrastructure may further take decisions by which it dynamically changes the routing (e.g., on the basis of load balancing consideration or reconfiguration of the network).

The wireless connection 1226 between the UE 1214 and the base station 1218 is in accordance with the teachings of the embodiments described throughout this disclosure. One or more of the various embodiments improve the performance of OTT services provided to the UE 1214 using the OTT connection 1216, in which the wireless connection 1226 forms the last segment.

A measurement procedure may be provided for the purpose of monitoring data rate, latency, and other factors on which the one or more embodiments improve. There may further be an optional network functionality for reconfiguring the OTT connection 1216 between the host computer 1202 and the UE 1214, in response to variations in the measurement results. The measurement procedure and/or the network functionality for reconfiguring the OTT connection 1216 may be implemented in the software 1210 and the hardware 1204 of the host computer 1202 or in the software 1240 and the hardware 1234 of the UE 1214, or both. In some embodiments, sensors (not shown) may be deployed in or in association with communication devices through which the OTT connection 1216 passes; the sensors may participate in the measurement procedure by supplying values of the monitored quantities exemplified above, or supplying values of other physical quantities from which the software 1210, 1240 may compute or estimate the monitored quantities. The reconfiguring of the OTT connection 1216 may include message format, retransmission settings, preferred routing, etc.; the reconfiguring need not affect the base station 1218, and it may be unknown or imperceptible to the base station 1218. Such procedures and functionalities may be known and practiced in the art. In certain embodiments, measurements may involve proprietary UE signaling facilitating the host computer 1202's measurements of throughput, propagation times, latency, and the like. The measurements may be implemented in that the software 1210 and 1240 causes messages to be transmitted, in particular empty or 'dummy' messages, using the OTT connection 1216 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1300, the host computer provides user data. In sub-step 1302 (which may be optional) of step 1300, the host computer provides the user data by executing a host application. In step 1304, the host computer initiates a transmission carrying the user data to the UE. In step 1306 (which may be optional), the base station transmits to the UE the user data which was carried in the transmission that the host computer initiated, in accordance with the teachings of the embodiments described throughout this disclosure. In step 1308 (which may also be optional), the UE executes a client application associated with the host application executed by the host computer.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1400 of the method, the host computer provides user data. In an optional sub-step (not shown) the host computer provides the user data by executing a host application. In step 1402, the host computer initiates a transmission carrying the user data to the UE. The transmission may pass via the base station, in accordance with the teachings of the embodiments described throughout this disclosure. In step 1404 (which may be optional), the UE receives the user data carried in the transmission.

Figures 15, 16:
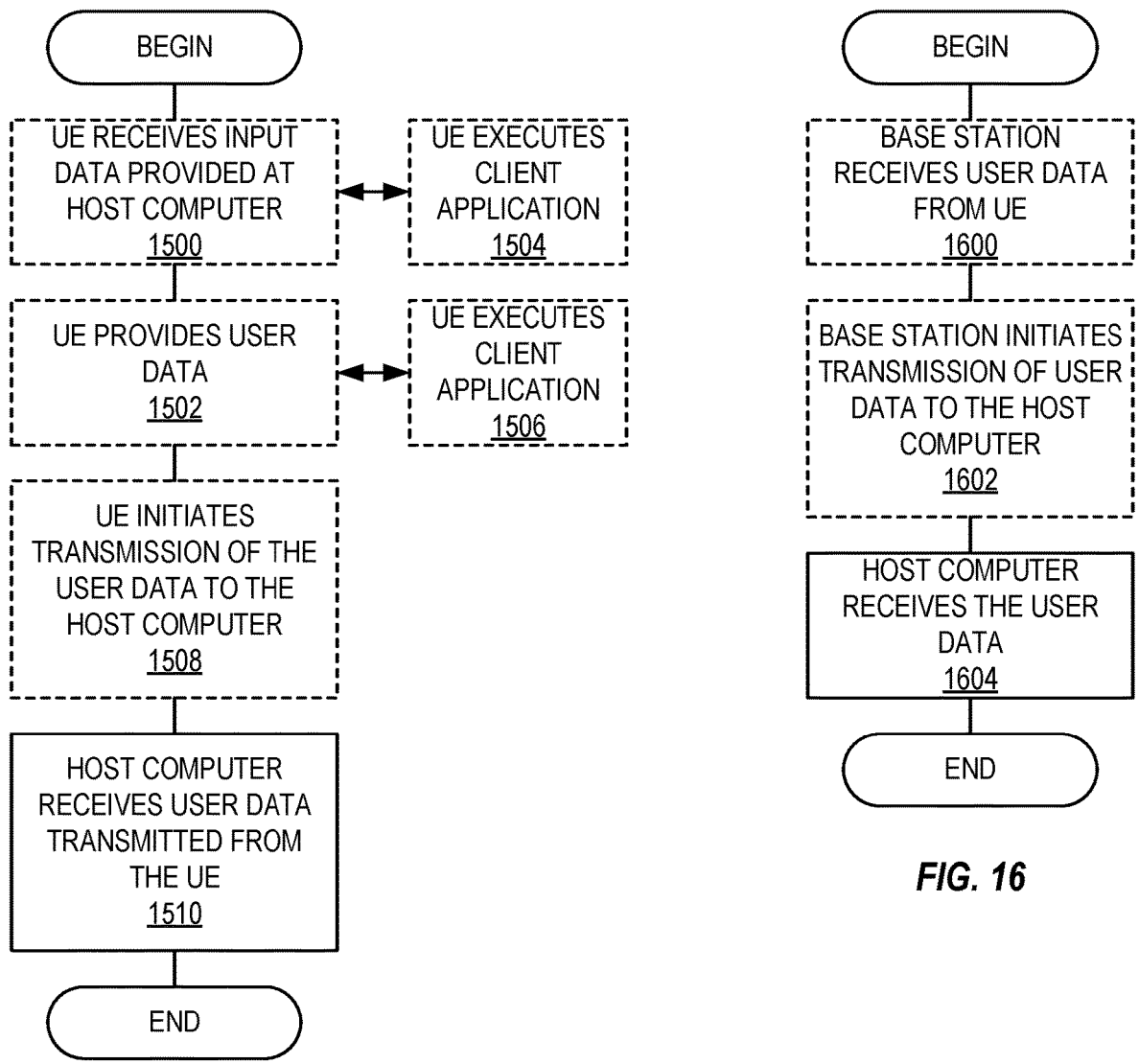
FIG. 15 is a flowchart illustrating a method implemented in a communication system, according to some embodiments of the present disclosure.
FIG. 16 is a flowchart illustrating a method implemented in a communication system, according to some embodiments of the present disclosure.

FIG. 15 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 15 will be included in this section. In step 1500 (which may be optional), the UE receives input data provided by the host computer. Additionally or alternatively, in step 1502, the UE provides user data. In sub-step 1504 (which may be optional) of step 1500, the UE provides the user data by executing a client application. In sub-step 1506 (which may be optional) of step 1502, the UE executes a client application which provides the user data in reaction to the received input data provided by the host computer. In providing the user data, the executed client application may further consider user input received from the user. Regardless of the specific manner in which the user data was provided, the UE initiates, in sub-step 1508 (which may be optional), transmission of the user data to the host computer. In step 1510 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 16 will be included in this section. In step 1600 (which may be optional), in accordance with the teachings of the embodiments described throughout this disclosure, the base station receives user data from the UE. In step 1602 (which may be optional), the base station initiates transmission of the received user data to the host computer. In step 1604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Select Embodiments

What follows is a listing of some exemplary embodiments of the present disclosure. Some of the enumerated embodiments make specific reference to other embodiments. It should be noted that combinations of the enumerated embodiments are included in this disclosure beyond the explicitly stated combinations or relationships. Thus, various aspects of the following embodiments can be combined except where explicitly or inherently contradictory.

Group A Embodiments

Embodiment 1. A method performed by a wireless device for improving link level performance in a non-terrestrial network (NTN), the method comprising one or more of the following actions:
 improving (300) downlink synchronization performance in the NTN;
 improving (302) uplink random access performance in the NTN;
 improving (304) positioning reference signal performance in the NTN;
 improving (306) signal cell multicast performance in the NTN;
 improving (308) broadcast/multicast with forward-link only cell in the NTN;
 supporting (310) both broadcast/multicast and unicast in the NTN; and
 supporting (312) both broadcast/multicast and unicast via adaptive beamforming in the NTN.

Embodiment 2. The method of embodiment 1, wherein improving (300) downlink synchronization performance in the NTN comprises one or more of the following actions:
 configuring an NB-IoT (narrowband-Internet of Things) NPSS (Narrowband Primary Synchronization Signal) transmissions in multiple spot beams overlapping in time and frequency;
 configuring LTE PSS (Primary Synchronization Signal) transmissions in multiple beams overlapping in time and frequency;
 configuring NR (New Radio) PSS transmissions (e.g., which support the same shift of a respective M-sequence that defines the NR PSS) in multiple beams overlapping in time and frequency; and
 configuring NR PSS transmissions (e.g., which support the same shift of a respective M-sequence that defines the NR PSS) in multiple beams configured to share the same SS/PBCH block index overlapping in time and frequency.

Embodiment 3. The method of embodiment 1, wherein improving (302) uplink random access performance in the NTN comprises configuring LTE, NB-IoT and NR PRACH time-frequency resources that are overlapping in a set of spot beams.

Embodiment 4. The method of embodiment 1, wherein improving (304) positioning reference signal performance in the NTN comprises one or more of the following actions:
- configuring an LTE and NB-IoT PRS (Positioning Reference Signal) time-frequency resource that are overlapping in a set of spot beams; and
- configuring an LTE SRS (Sounding Reference Signal) time-frequency resources that is overlapping in a set of spot beams.

Embodiment 5. The method of embodiment 1, wherein improving (306) signal cell multicast performance in the NTN comprises one or more of the following actions:
- configuring an LTE and NB-IoT SC-PTM SIB20, SC-MCCH and SC-MTCH transmissions on (M/N) PDCCH and (N)PDSCH time-frequency resource that are overlapping in a set of spot beams;
- configuring the Type 1A and Type 2A CSS identically in all beams; and
- applying identical bit and resource element level scrambling across all spot beams.

Embodiment 6. The method of embodiment 1, wherein improving (308) broadcast/multicast with forward-link only cell in the NTN comprises signaling that a cell is a broadcast/multicast cell having only forward link via explicit or implicit signaling.

Embodiment 7. The method of embodiment 6, wherein supporting (310) both broadcast/multicast and unicast in the NTN comprises one or more of the following actions:
- transmitting SS/PBCH as well as other physical channels used for system information acquisition and setting up a data session in connected mode in a first set of beams; and
- transmitting CSI-RS in a second set of beams.

Embodiment 8. The method of embodiment 7, wherein supporting (312) both broadcast/multicast and unicast via adaptive beamforming in the NTN comprises replacing the first set and second set of beams by a first beam pattern and a second beam pattern, respectively.

Embodiment 9. The method of any of the previous embodiments, further comprising:
- providing user data; and
- forwarding the user data to a host computer via the transmission to the base station.

Group B Embodiments

Embodiment 10. A method performed by a base station for improving link level performance in a non-terrestrial network (NTN), the method comprising one or more of the following actions:
- improving (400) downlink synchronization performance in the NTN;
- improving (402) uplink random access performance in the NTN;
- improving (404) positioning reference signal performance in the NTN;
- improving (406) signal cell multicast performance in the NTN;
- improving (408) broadcast/multicast with forward-link only cell in the NTN;
- supporting (410) both broadcast/multicast and unicast in the NTN; and
- supporting (412) both broadcast/multicast and unicast via adaptive beamforming in the NTN.

Embodiment 11. The method of any of the previous embodiments, further comprising:
- obtaining user data; and
- forwarding the user data to a host computer or a wireless device.

Group C Embodiments

Embodiment 12. A wireless device for improving link level performance in a non-terrestrial network (NTN), the wireless device comprising:
- processing circuitry configured to perform any of the steps of any of the Group A embodiments; and
- power supply circuitry configured to supply power to the wireless device.

Embodiment 13. A base station for improving link level performance in a non-terrestrial network (NTN), the base station comprising:
- processing circuitry configured to perform any of the steps of any of the Group B embodiments; and
- power supply circuitry configured to supply power to the base station.

Embodiment 14. A User Equipment, UE, for improving link level performance in a non-terrestrial network (NTN), the UE comprising:
- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

Embodiment 15. A communication system including a host computer comprising:
- processing circuitry configured to provide user data; and
- a communication interface configured to forward the user data to a cellular network for transmission to a User Equipment, UE;
- wherein the cellular network comprises a base station having a radio interface and processing circuitry, the base station's processing circuitry configured to perform any of the steps of any of the Group B embodiments.

Embodiment 16. The communication system of the previous embodiment further including the base station.

Embodiment 17. The communication system of the previous 2 embodiments, further including the UE, wherein the UE is configured to communicate with the base station.

Embodiment 18. The communication system of the previous 3 embodiments, wherein:
- the processing circuitry of the host computer is configured to execute a host application, thereby providing the user data; and
- the UE comprises processing circuitry configured to execute a client application associated with the host application.

Embodiment 19. A method implemented in a communication system including a host computer, a base station, and a User Equipment, UE, the method comprising:
- at the host computer, providing user data; and
- at the host computer, initiating a transmission carrying the user data to the UE via a cellular network comprising the base station, wherein the base station performs any of the steps of any of the Group B embodiments.

Embodiment 20. The method of the previous embodiment, further comprising, at the base station, transmitting the user data.

Embodiment 21. The method of the previous 2 embodiments, wherein the user data is provided at the host computer by executing a host application, the method further comprising, at the UE, executing a client application associated with the host application.

Embodiment 22. A User Equipment, UE, configured to communicate with a base station, the UE comprising a radio interface and processing circuitry configured to perform the method of the previous 3 embodiments.

Embodiment 23. A communication system including a host computer comprising:
- processing circuitry configured to provide user data; and
- a communication interface configured to forward user data to a cellular network for transmission to a User Equipment, UE;
- wherein the UE comprises a radio interface and processing circuitry, the UE's components configured to perform any of the steps of any of the Group A embodiments.

Embodiment 24. The communication system of the previous embodiment, wherein the cellular network further includes a base station configured to communicate with the UE.

Embodiment 25. The communication system of the previous 2 embodiments, wherein:
- the processing circuitry of the host computer is configured to execute a host application, thereby providing the user data; and
- the UE's processing circuitry is configured to execute a client application associated with the host application.

Embodiment 26. A method implemented in a communication system including a host computer, a base station, and a User Equipment, UE, the method comprising:
- at the host computer, providing user data; and
- at the host computer, initiating a transmission carrying the user data to the UE via a cellular network comprising the base station, wherein the UE performs any of the steps of any of the Group A embodiments.

Embodiment 27. The method of the previous embodiment, further comprising at the UE, receiving the user data from the base station.

Embodiment 28. A communication system including a host computer comprising:
- communication interface configured to receive user data originating from a transmission from a User Equipment, UE, to a base station;
- wherein the UE comprises a radio interface and processing circuitry, the UE's processing circuitry configured to perform any of the steps of any of the Group A embodiments.

Embodiment 29. The communication system of the previous embodiment, further including the UE.

Embodiment 30. The communication system of the previous 2 embodiments, further including the base station, wherein the base station comprises a radio interface configured to communicate with the UE and a communication interface configured to forward to the host computer the user data carried by a transmission from the UE to the base station.

Embodiment 31. The communication system of the previous 3 embodiments, wherein:
- the processing circuitry of the host computer is configured to execute a host application; and
- the UE's processing circuitry is configured to execute a client application associated with the host application, thereby providing the user data.

Embodiment 32. The communication system of the previous 4 embodiments, wherein:
- the processing circuitry of the host computer is configured to execute a host application, thereby providing request data; and
- the UE's processing circuitry is configured to execute a client application associated with the host application, thereby providing the user data in response to the request data.

Embodiment 33. A method implemented in a communication system including a host computer, a base station, and a User Equipment, UE, the method comprising:
- at the host computer, receiving user data transmitted to the base station from the UE, wherein the UE performs any of the steps of any of the Group A embodiments.

Embodiment 34. The method of the previous embodiment, further comprising, at the UE, providing the user data to the base station.

Embodiment 35. The method of the previous 2 embodiments, further comprising:
- at the UE, executing a client application, thereby providing the user data to be transmitted; and
- at the host computer, executing a host application associated with the client application.

Embodiment 36. The method of the previous 3 embodiments, further comprising:
- at the UE, executing a client application; and
- at the UE, receiving input data to the client application, the input data being provided at the host computer by executing a host application associated with the client application;
- wherein the user data to be transmitted is provided by the client application in response to the input data.

Embodiment 37. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 38. The communication system of the previous embodiment further including the base station.

Embodiment 39. The communication system of the previous 2 embodiments, further including the UE, wherein the UE is configured to communicate with the base station.

Embodiment 40. The communication system of the previous 3 embodiments, wherein:
- the processing circuitry of the host computer is configured to execute a host application; and
- the UE is configured to execute a client application associated with the host application, thereby providing the user data to be received by the host computer.

Embodiment 41. A method implemented in a communication system including a host computer, a base station, and a User Equipment, UE, the method comprising:

at the host computer, receiving, from the base station, user data originating from a transmission which the base station has received from the UE, wherein the UE performs any of the steps of any of the Group A embodiments.

Embodiment 42. The method of the previous embodiment, further comprising at the base station, receiving the user data from the UE.

Embodiment 43. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
2G Second Generation
3G Third Generation
3GPP Third Generation Partnership Project
4G Fourth Generation
5G Fifth Generation
ABS Almost Blank Subframe
AC Alternating Current
AF Application Function
AMF Access and Mobility Management Function
AN Access Network
AP Access Point
ARQ Automatic Repeat Request
ASIC Application Specific Integrated Circuit
ATM Asynchronous Transfer Mode
AUSF Authentication Server Function
AWGN Additive White Gaussian Noise
BCCH Broadcast Control Channel
BCH Broadcast Channel
BS Base Station
BSC Base Station Controller
BTS Base Transceiver Station
BW Bandwidth
BWP Bandwidth Part
CA Carrier Aggregation
CC Component Carrier
CCCH Common Control Channel
CD Compact Disk
CDMA Code Division Multiple Access
CGI Cell Global Identifier
CIR Channel Impulse Response
COTS Commercial Off-the-Shelf
CP Cyclic Prefix
CPE Customer Premise Equipment
CPICH Common Pilot Channel
CPICH Ec/No Common Pilot Channel received energy per chip divided by the power density in the band
CPU Central Processing Unit
CQI Channel Quality Information
C-RNTI Cell Radio Network Temporary Identifier
CSI Channel State Information
CSI-RS Channel State Information Reference Signal
D2D Device-to-Device
DAS Distributed Antenna System
DC Direct Current
DCCH Dedicated Control Channel
DIMM Dual In-Line Memory Module
DL Downlink
DM Demodulation
DMRS Demodulation Reference Signal
DN Data Network
DRX Discontinuous Reception
DSP Digital Signal Processor
DTX Discontinuous Transmission
DTCH Dedicated Traffic Channel
DUT Device Under Test
DVD Digital Video Disk
E-CID Enhanced Cell Identifier (positioning method)
EEPROM Electrically Erasable Programmable Read Only Memory
ECGI Evolved Cell Global Identifier
eMTC Enhanced Machine-Type Communication
eNB Enhanced or Evolved Node B
ePDCCH Enhanced Physical Downlink Control Channel
EPROM Erasable Programmable Read Only Memory
E-SMLC Evolved Serving Mobile Location Center
E-UTRA Evolved Universal Terrestrial Radio Access
E-UTRAN Evolved Universal Terrestrial Radio Access Network
FDD Frequency Division Duplexing
FFS For Further Study
FPGA Field Programmable Gate Array
GERAN Global System for Mobile (GSM) Communications Enhanced Data Rates for GSM Evolution Radio Access Network
GHz Gigahertz
gNB New Radio Base Station
GNSS Global Navigation Satellite System
GPS Global Positioning System
GSM Global System for Mobile Communications
HARQ Hybrid Automatic Repeat Request
HDDS Holographic Digital Data Storage
HD-DVD High-Density Digital Versatile Disc
HO Handover
HRPD High Rate Packet Data
HSPA High Speed Packet Access
I/O Input and Output
IoT Internet of Things
IP Internet Protocol
LAN Local Area Network
LEE Laptop Embedded Equipment
LME Laptop Mounted Equipment
LOS Line of Sight
LPP Long Term Evolution Positioning Protocol
LTE Long Term Evolution
M2M Machine-to-Machine
MAC Medium Access Control
MANO Management and Orchestration
MBMS Multimedia Broadcast Multicast Services
MB SFN Multimedia Broadcast Multicast Service Single Frequency Network
MCE Multi-Cell/Multicast Coordination Entity
MDT Minimization of Drive Tests
MIB Master Information Block
MIMO Multiple Input Multiple Output
MME Mobility Management Entity
MSC Mobile Switching Center
MSR Multi-Standard Radio
MTC Machine Type Communication
NB-IoT Narrowband Internet of Things
NEF Network Exposure Function
NF Network Function
NFV Network Function Virtualization
NIC Network Interface Controller NPDCCH Narrowband Physical Downlink Control Channel
NR New Radio
NRF Network Repository Function
NSSF Network Slice Selection Function
O&M Operation and Maintenance
OCNG Orthogonal Frequency Division Multiple Access Channel Noise Generator
OFDM Orthogonal Frequency Division Multiplexing
OFDMA Orthogonal Frequency Division Multiple Access
OSS Operations Support System
OTDOA Observed Time Difference of Arrival
OTT Over-the-Top
PBCH Physical Broadcast Channel
P-CCPCH Primary Common Control Physical Channel
PCell Primary Cell
PCF Policy Control Function
PCFICH Physical Control Format Indicator Channel
PDA Personal Digital Assistant
PDCCH Physical Downlink Control Channel
PDP Profile Delay Profile
PDSCH Physical Downlink Shared Channel
P-GW Packet Data Network Gateway
PHICH Physical Hybrid Automatic Repeat Request Indicator Channel
PLMN Public Land Mobile Network
PMI Precoder Matrix Indicator
PRACH Physical Random Access Channel
PRB Physical Resource Block
PROM Programmable Read Only Memory
PRS Positioning Reference Signal
PSS Primary Synchronization Signal
PSTN Public Switched Telephone Networks
PUCCH Physical Uplink Control Channel
PUSCH Physical Uplink Shared Channel
QoS Quality of Service
RACH Random Access Channel
RAID Redundant Array of Independent Disks
RAM Random Access Memory
RAN Radio Access Network
RAT Radio Access Technology
RE Resource Element
RF Radio Frequency
RLM Radio Link Management
RNC Radio Network Controller
RNTI Radio Network Temporary Identifier
ROM Read Only Memory
RRC Radio Resource Control
RRH Remote Radio Head
RRM Radio Resource Management
RRU Remote Radio Unit
RS Reference Signal
RSCP Received Signal Code Power
RSRP Reference Symbol Received Power/Reference Signal Received Power
RSRQ Reference Symbol Received Quality/Reference Signal Received Quality
RSSI Received Signal Strength Indicator
RSTD Reference Signal Time Difference
RTT Round Trip Time
RUIM Removable User Identity
SCEF Service Capability Exposure Function
SCell Secondary Cell
SCH Synchronization Channel
SDRAM Synchronous Dynamic Random Access Memory
SDU Service Data Unit
SFN System Frame Number
S-GW Serving Gateway
SI System Information
SIB System Information Block
SIM Subscriber Identity Module
SMF Session Management Function
SNR Signal to Noise Ratio
SOC System on a Chip
SON Self-Organizing Network
SONET Synchronous Optical Networking
SRS Sounding Reference Signal
SS Synchronization Signal
SSS Secondary Synchronization Signal
TCP Transmission Control Protocol
TDD Time Division Duplexing
TDOA Time Difference of Arrival
TOA Time of Arrival
TPMI Transmit Precoding Matrix Indicator
TRP Transmission/Reception Point
TSS Tertiary Synchronization Signal
TTI Transmission Time Interval
UDM Unified Data Management
UE User Equipment
UL Uplink
UMTS Universal Mobile Telecommunications System
USB Universal Serial Bus
USIM Universal Subscriber Identity Module
UTDOA Uplink Time Difference of Arrival
UTRA Universal Terrestrial Radio Access
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A non-terrestrial network, NTN, satellite for use in a cellular telecommunications network, the NTN satellite comprising:
   a transmission system configured to support a service link for communicating with a user equipment and a feeder link for communicating with a gateway, the transmission system further supporting:
   one or more cells used for system information acquisition and setting up a data session in connected mode; and
   the one or more cells comprising a first set of beams that is configured to transmit and receive physical channel transmissions for system information acquisition and for setting up a unicast connected mode data session, and a second set of beams that is configured to transmit CSI-RS transmission.

2. The NTN satellite of claim 1, wherein the first set of beams is configured to receive uplink information on at least one of:

physical random access channel, PRACH;
physical uplink shared channel, PUSCH, for Msg-3; and
physical uplink control channel, PUCCH, Msg-5.

3. The NTN satellite of claim 1, wherein the second set of beams is a subset of the first set of beams.

4. The NTN satellite of claim 1, wherein the physical channel transmissions and receptions are performed by joint transmission and receptions in overlapping time and frequency resources across the first set of beams.

5. The NTN satellite of claim 1, wherein the NTN is configured to receive a CSI-RS measurement report from the user equipment, wherein the CSI-RS measurement report contains information for determining a subset of beams for unicast communication during a connected mode data session with the user equipment.

6. The NTN satellite of claim 1, wherein the transmission system is configured to:
  receive a CSI-RS measurement report from the user equipment; and
  transmit and receive data in a unicast data session with the user equipment using a subset of beams of a set of beams, the subset being based on the CSI-RS measurement report.

7. The NTN satellite of claim 6, wherein the transmission system is configured to:
  transmit information from the CSI-RS measurement report to a network node of the cellular telecommunications network; and
  receive information identifying the subset of beams.

8. A non-terrestrial network, NTN, satellite for use in a cellular telecommunications network, the NTN satellite comprising:
  a transmission system configured to support a service link for communicating with a user equipment and a feeder link for communicating with a gateway, the transmission system further supporting:
    a first architecture tier comprising one or more forward-link only cells;
    a second architecture comprising one or more bi-directional link cells;
    one or more cells used for system information acquisition and setting up a data session in connected mode; and
    the one or more cells comprising a first set of beams that is configured to transmit and receive physical channel transmissions for system information acquisition and for setting up a unicast connected mode data session, and a second set of beams that is configured to transmit CSI-RS transmission.

9. The NTN satellite of claim 8, wherein when a first cell configured for broadcast/multicast transmits a transmission of a first type, that transmission of the first type is made in a set of overlapping time-frequency resources in a set of overlapping beams of the first cell.

10. The NTN satellite of claim 8, wherein the transmission of the first type is one of the following transmission types:
  a synchronization signal, SS, transmission;
  a physical broadcast channel, PBCH, transmission;
  a physical downlink control channel, PDCCH, transmission;
  a physical downlink shared channel, PDSCH, transmission; and
  a channel state information reference signal, CSI-RS; transmission.

11. The NTN satellite of claim 9, wherein the first cell signals to the user equipment to indicate if the first cell supports forward-link only.

12. The NTN satellite of claim 11, wherein the first cell signals, via transmitted system information, to indicate if the first cell supports forward-link only.

13. The NTN satellite of claim 11, wherein the first cell signals by implicit signalling to indicate if the first cell supports forward-link only.

14. The NTN satellite of claim 13, wherein the implicit signalling comprises not configuring physical random access channel, PRACH, resources to prevent the user equipment from initiating a random access procedure in the first cell.

15. A user equipment configured for communication with a cellular communication network including an NTN satellite, the user equipment comprising:
  a transmitter to send and receive transmissions;
  a processing device in communication with the transmitter and a memory storing instructions that when executed by the processing device cause the user equipment to:
    receive a CSI-RS transmission from a set of beams in a cell of the NTN satellite;
    transmit a CSI-RS measurement report to the NTN satellite, the CSI-RS useable to determine a subset of the set of beams in the cell based on the received CSI-RS transmission; and
    transmit and receive data, via the subset of beams, in a unicast data session with the NTN.

16. The user equipment of claim 15, wherein the subset of the set of beams includes only one beam from the set of beams.

17. A network node operable in a cellular telecommunications network that includes an NTN satellite, the network node comprising:
  a transmitter to send and receive transmissions;
  a processing device in communication with the transmitter and a memory storing instructions that when executed by the processing device cause the network node to:
    receive a CSI-RS measurement report from a user equipment via the NTN satellite;
    determine based on the CSI-RS measurement report to use a subset of a set of beams in a cell provided by the NTN satellite;
    transmit an indication of the subset to the NTN satellite; and
    transmit and receive data of a unicast data session to the NTN satellite for retransmission to the user equipment.

18. The user equipment of claim 17, wherein the subset of the set of beams includes only one beam from the set of beams.

* * * * *